United States Patent

[11] 3,537,578

[72] Inventor Vincent D. Figliuzzi
1101 N. Central Ave., Chicago, Illinois 60651
[21] Appl. No. 797,204
[22] Filed Feb. 6, 1969
[45] Patented Nov. 3, 1970

[54] TAPE
4 Claims, 4 Drawing Figs.
[52] U.S. Cl. .................................................. 206/59,
117/68.5
[51] Int. Cl. .................................................. B65d 85/67
[50] Field of Search .................................................. 206/59(C),
58, 52; 117/68.5

[56] References Cited
UNITED STATES PATENTS
| | | | |
|---|---|---|---|
| 2,103,892 | 12/1937 | Brown ........................... | 206/59(C)UX |
| 2,636,835 | 4/1953 | Bouhware et al. ......... | 206/59(C) |
| 2,857,047 | 10/1958 | Edelson ........................ | 206/58 |
| 3,247,956 | 4/1966 | Rosen ........................... | 206/59(C) |

Primary Examiner—William T. Dixon, Jr.
Attorney—Alter and Weiss

ABSTRACT: Includes a novel means for enabling the determination of the free end of a piece of tape on a roll, or the like so that the tape can be unraveled from its roll.

Patented Nov. 3, 1970

3,537,578

INVENTOR
VINCENT O. FIGLIUZZI

BY
*Alter and Weiss*
ATTORNEYS

TAPE

This invention relates to a new and improved means for marking a tape so that the location of the free end thereof can be ascertained in order that it can be unraveled, or freed from the roll when this is desired.

It is well known that in the use of pressure sensitive tape such as insulating tape, or the like, it is difficult to locate the free end thereof on a roll to unravel the same when it is desired.

While many different techniques have been been suggested and tried in the past, these have not provided a solution to this ever existing problem in the same fashion or with the same efficiency as my present invention.

My present invention includes a simple method of marking tape so that the efficiency of the tape is not impaired while still performing the function of locating the free end of the tape. While the invention has for its function the location of the free end of the tape, an additional function thereof is to designate the source of origin of the tape by rendering the tape distinctive in appearance.

It is thus a primary object of this invention to provide a new and improved means of marking the free end of tape which is stored in a roll form so that the end thereof can be located and ascertained and unraveled from the roll.

It is further an object of this invention to provide a means for distinctively marking the tape so that not only is the function of locating the end of the tape so that it can be unraveled with ease but also to mark the tape distinctively so that the source of origin is designated thereby.

Other and further objects of this invention will become more readily apparent from reading the following description in connection with the following FIGS. wherein.

Figure 1:
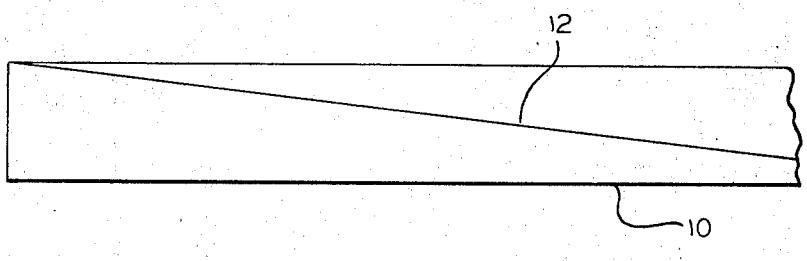
FIG. 1 is a top view of a fragmentary portion of the tape illustrating a preferred manner of marking the tape.
Figure 2:
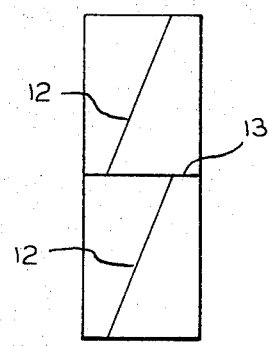
FIG. 2 is a side elevational view of a roll of tape wherein the free end thereof can be ascertained by viewing the roll.
Figure 3:
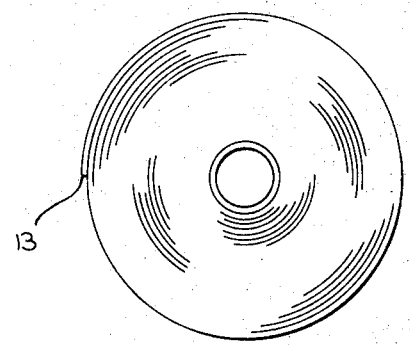
FIG. 3 is a side elevational view of FIG. 2.

Referring to the drawing wherein like characters of reference indicate corresponding parts throughout, the preferred embodiment of my invention is illustrated in FIG. 1 wherein a piece of tape 10 has a continuous marking 12 imprinted thereon which preferably extends diagonally from one corner of the tape at the end thereof down to the other end thereof at the other corner of the tape. After the tape is formed into a roll as shown in FIGS. 2 and 3, the free end of the tape as designated by 13 in FIGS. 2 and 3 can be plainly visualized because of the fact that the continuous line 12 thereof is broken and separated at the free end 13 of the tape.

Figure 4:
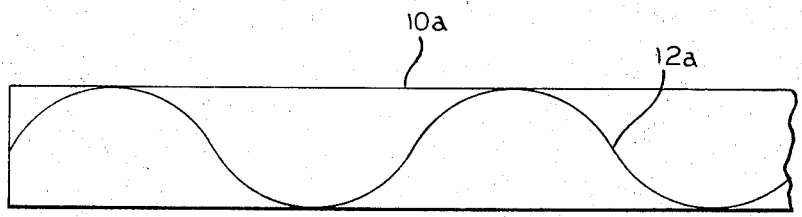
FIG. 4 is a top view of a fragmentary portion of the tape illustrating another pattern of marking the tape.

The invention can, of course, take on other variations and thus, in FIG. 4 another embodiment of the invention can be seen. In FIG. 4, it can be seen that a repeating pattern is imprinted on the tape. Thus, when it is desired to locate the free end of the tape, the same effect can be created by this pattern.

Thus, from a reading of the description herein in connection with the drawing, it can be seen that the invention fulfills the objects stated herein in a remarkably unexpected fashion. By merely imprinting the tape as taught herein, not only can the free end of the tape be ascertained but the appearance of the tape is distinctive and therefore capable of designating the source of origin thereof.

While the principles of the invention have been described above in connection with specific apparatus and applications, it is to be understood that this description is made only by way of example and not as a limitation on the scope of the invention.

I claim:

1. A longitudinally extending strip of tape:
    said strip having adhesive on one side thereof and being coiled on itself to form a roll having an inner end and an outer end;
    portions of said outer end being removed for use of the tape; and
    marking means applied to the nonadhesive side of the strip for aiding in detecting the said outer end of said roll regardless of how much said tape is used.

2. The longitudinally extending strip of tape of claim 1 wherein said marking means comprises a longitudinally extending marking strip, said marking strip arranged not to coincide with the marking strip on the portion of the tape under the outer end so as to mark the end of the tape.

3. The longitudinally extending strip of tape of claim 2 wherein said marking strip extends from said inner end to said outer end and is arranged helically whereby the marking strip at the outer end does not coincide with the marking strip on the portion of the tape under the outer end.

4. The longitudinally extending strip of tape of claim 1 wherein said marking means compromises varying printed patterns on the tape whereby the pattern on said outer end contrasts to the pattern on the portion of the roll of tape under the outer end regardless of how much of said tape is used.